United States Patent [19]

Hillmann et al.

[11] 4,320,810
[45] Mar. 23, 1982

[54] VEHICLE WITH IMPROVED STEERING SYSTEM DEVICE

[75] Inventors: Kermit C. Hillmann, Cokato; Tom H. Holsapple, Silver Lake, both of Minn.

[73] Assignee: Chromalloy American Corporation, Cokato, Minn.

[21] Appl. No.: 104,046

[22] Filed: Dec. 17, 1979

[51] Int. Cl.³ ............................................. B62D 11/04
[52] U.S. Cl. .................................... 180/6.3; 180/6.48
[58] Field of Search ...................... 180/6.3, 6.26, 6.28, 180/6.32, 6.48, 135, 140; 91/517

[56] References Cited

U.S. PATENT DOCUMENTS

| | | | |
|---|---|---|---|
| 2,651,377 | 9/1953 | Lapsley et al. | 180/6.3 |
| 3,584,537 | 6/1971 | Schulz | 91/517 |
| 4,077,490 | 3/1978 | Casterton et al. | 180/6.3 X |

*Primary Examiner*—John A. Pekar
*Attorney, Agent, or Firm*—Dorsey, Windhorst, Hannaford, Whitney & Halladay

[57] ABSTRACT

A steering assist device for a vehicle of the type having a pair of drive wheels in which steering is accomplished by applying differential hydraulic flow to the drive wheels and a non-driven castor wheel. The steering assist device includes a power cylinder for rotating the non-driven castor wheel about a vertical axis, a device for sensing or providing access to the hydraulic pressure driving the drive wheels and a control device for controlling the actuation of the power cylinder in response to the hydraulic pressure driving the drive wheels in such a way that the non-driven castor wheel is rotated to assist the drive wheel being driven by the greater hydraulic pressure.

20 Claims, 7 Drawing Figures

VEHICLE WITH IMPROVED STEERING SYSTEM DEVICE

BACKGROUND OF THE INVENTION

The present invention relates generally to an improved steering system for a tractor or other vehicle of the type having a pair of driven wheels and a third, freely rotatable castor or tail wheel or wheels. More particularly, the present invention relates to a steering assist device for use in connection with such a vehicle for mechanically turning the tail or castor wheel to compensate for side hill drift and to assist in turning the vehicle when it is driven on level ground.

Tractors or other power vehicles of the type with which the present invention has specific application have been in existence for many years. Such tractors are commonly used as orchard tractors and generally include a pair of forwardly disposed driven wheels and a rear, freely rotatable tail or castor wheel. These tractors are not steered in the conventional manner by mechanically rotating one or more of its wheels about a vertical axis. Rather, steering of the vehicle is controlled by the application of differential hydraulic flow to the respective drive wheels. For example, by providing a greater hydraulic flow to the drive motor for the right drive wheel, the right wheel will tend to move faster than the left, thus resulting in the tractor turning to the left. The rear castor wheel, in these vehicles, of course, merely trails the pair of drive wheels and serves primarily to support the rearward end of the vehicle.

One of the problems that has existed with respect to tractors and power vehicles of this sort is that when they are driven on the side of a hill, the rearward end, the end supported by the castor wheel, tends to roll down the hill. Thus, the drive wheels at the forward end have two jobs. One is to help drive the tractor forward, the second is to hold the rearward end of the tractor on the hill. This is particularly true of the drive wheel on the uphill side which must pull and hold the rear end of the tractor up on the hill while the lower wheel acts a pivot point. Thus, greater hydraulic pressures are needed to drive the uphill wheel, while the lower wheel need only develop enough pressure to help drive the machine forward. Although the hydraulic pump and motor for the uphill wheel is generally capable of producing enough pressure and driving force to perform both jobs, the problem has been that it does not have enough traction for both jobs. Because of the force tending to move the rearward end of the tractor down the hill and the distribution of weight being concentrated on the downhill wheel, the upper wheel tends to spin. Thus, the lower wheel goes forward, the upper wheel cannot go forward because of poor traction and as a result the rear end of the tractor swings down the hill.

The above-mentioned problem, while more pronounced when the tractor is being driven on the side of a hill, also exists when the tractor is being turned on level ground. When the tractor is moving straight ahead, the only job of the drive wheels is to move the vehicle in a forward direction. When the tractor is turned, however, one of the drive wheels is driven faster than the other, thus causing the tractor to pivot relative to the other drive wheel and the rearward end of the tractor to swing around. Thus, in turning the tractor on level ground, the outside drive wheel must not only continue to move the vehicle forward, but must exert additional driving force to swing the rearward end of the vehicle in the manner mentioned above. Because of this, the outer drive wheel often slips when turning and the steering is generally not as responsive as desired.

Accordingly, there is a real need for a steering system and control and in particular a steering assist device which will alleviate the side hill drifting tendency of a tractor of the type described above and which will also eliminate similar problems when turning such vehicle on level ground.

SUMMARY OF THE INVENTION

In contrast to the prior art, the present invention relates to an improvement in the steering system of a tractor or other power vehicle of the type having a pair of drive wheels on which steering is accomplished by applying differential hydraulic flow thereto and a freely rotatable castor wheel. While the present invention has applicability to such a tractor with either forward drive wheels and a rear castor or rear drive wheels and a forward castor, the preferred embodiment described is with respect to the former. According to the present invention the improved steering system includes a steering assist device while eliminates side hill drift of the tractor when driven on the side of a hill and assists in turning the tractor on level ground. Such steering assist device is controlled by sensing or providing access to the different pressures from the hydraulic motors driving the pair of forward drive wheels.

In general, the steering assist device includes power means for rotating the castor wheel about a vertical axis, means for sensing the hydraulic pressure driving the respective forward drive wheels and a control means for controlling the power means in response to the respective pressures driving the drive wheels.

More particularly, hydraulic lines are tapped into the two drive pumps and are used as pilot lines to operate a pair of control valves. The control valves are associated with each other such that the pressures in the pilot lines controlling the valves oppose each other. Thus, the respective positions of the control valves is a function of the pressures created by the drive wheel pumps. If the pressures are equal, such as when the vehicle is moving in a straight ahead direction on level ground, the control valves are in their center position and generally non-operative. However, if one of the pressures from the drive units is greater than the other, such as when operating a vehicle on the side of a hill or when turning the vehicle on level ground, the greater pressure will cause the control valves to be shifted to one of two operative positions. This in turn causes a hydraulic cylinder to mechanically pivot the rear castor wheel in a direction assisting the drive wheel having the greater hydraulic pressure.

Thus, when the operator is operating the vehicle on the side of a hill, a greater pressure is developed in the uphill drive wheel. This greater pressure will shift the control valve to a position in which the hydraulic cylinder will be actuated to rotate the castor wheel in a manner which will assist the uphill wheel in keeping the rearward end of the vehicle from moving down the hill. Similarly, when greater pressure is developed in one of the drive wheels as the vehicle is turned on level ground, that greater pressure will shift the control valves so that the hydraulic cylinder will mechanically turn the trailing castor wheel to assist the swinging movement of the rearward end of the tractor about the pivot of the other drive wheel.

The present invention also includes means for locking out the above-mentioned steering assist device to permit the rear castor wheel to pivot freely. Such an option is particularly desired when the tractor goes from forward to reverse, or vice versa, frequently. This requires rather quick turning reaction. To overcome the slower turning response time created by the steering system in this particular situation, a small hydraulic cylinder is installed between the respective control valves to either activate or deactivate both valves in response to a manual control means. This opens both working ports of the control valves to the lower pressure reservoir tank allowing the steering cylinder to freely float and the castor wheel to freely rotate.

Accordingly, it is an object of the present invention to provide an improved steering system including a steering assist device for a tractor of the type having a pair of hydraulically driven drive wheels and a freely rotatable castor wheel means.

Another object of the present invention is to provide an improved control for a steering system for a rear, freely rotatable castor wheel in a vehicle having a pair of forward drive wheels.

Another object of the present invention is to provide an improved steering assist device which is controlled by the respective pressures of the drive units for the forward drive wheels.

A further object of the present invention is to provide a side hill compensating means for a tractor or other power vehicle having a pair of forward drive wheels and a rear castor wheel.

Another object of the present invention is to provide an improved steering assist device having means for deactivating such device when desired by the operator.

These and other objects of the present invention will become apparent with reference to the drawings, the description of the preferred embodiment and the appended claims.

DESCRIPTION OF THE DRAWINGS

FIG. 6 is a view, partially in section, of the center spool and valve shifting cylinder for deactivating the steering assist device.

FIG. 7 is a view, partially in section, of a shuttle valve as used in the present invention.

DESCRIPTION OF THE PREFERRED EMBODIMENT

Figure 1:
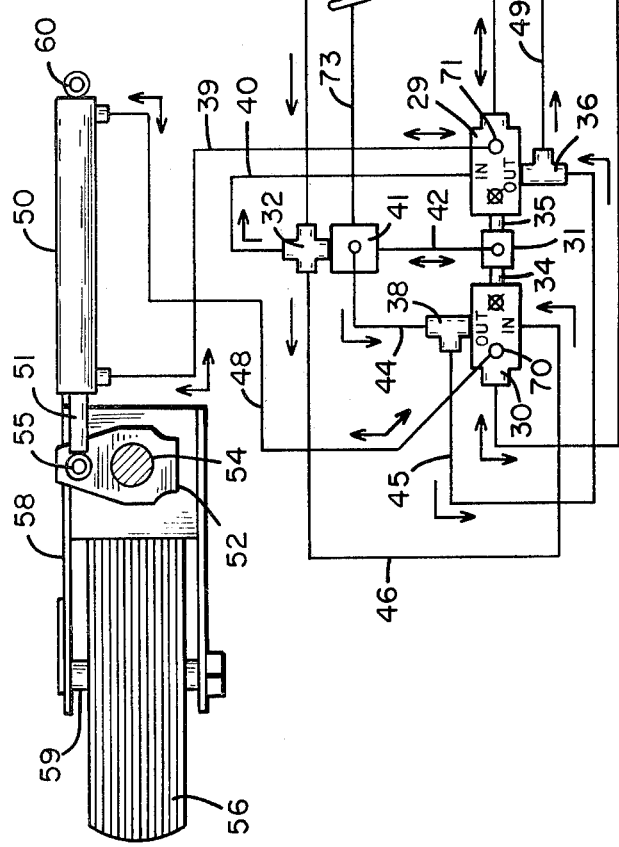
FIG. 1 is a schematic drawing of the hydraulic circuit for the steering assist device of the present invention.
Figure 2:
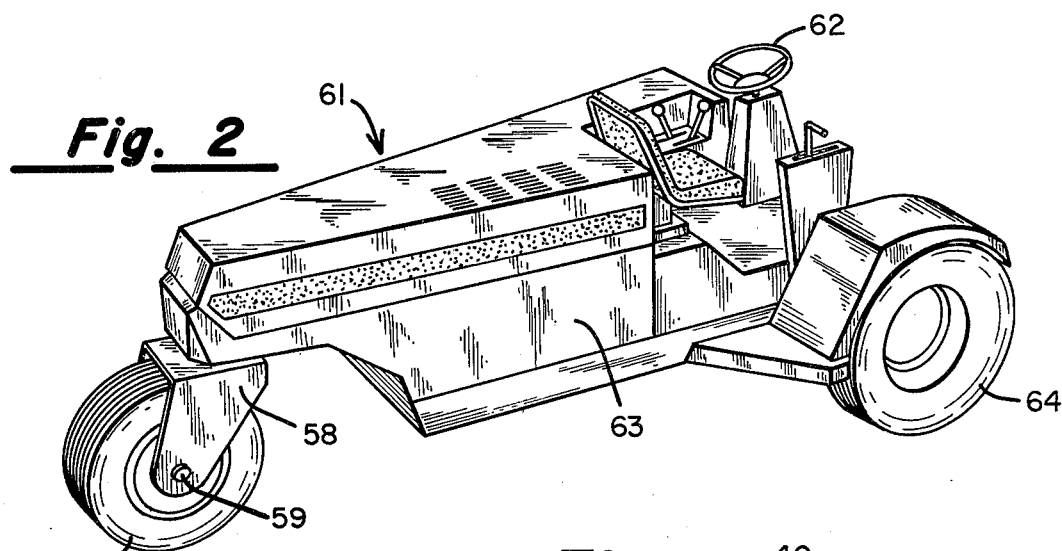
FIG. 2 is a pictorial view of a tractor of the type for which the steering assist device of the present invention has particular application.

Reference is first made to FIG. 1 which is a schematic representation of the hydraulic circuit for the steering assist device of the present invention and FIG. 2 which is a pictorial representation of the type of tractor for which the present invention has particular applicability. The tractor in FIG. 2, illustrated generally by the reference numeral 61, includes a body 63, a pair of drive wheels 64 (only one of which is shown) positioned at the forward end of the vehicle, a steering wheel 62 and a rear, freely rotatable tail or castor wheel 56. The castor wheel 56 is mounted to the bifurcated wheel support 58 about the shaft 59. As illustrated in FIG. 1, the wheel support 58 and castor wheel 56 are rotatably mounted in one of two rotatable directions about the vertical axis 54 relative to the vehicle body 63. The drive wheels 64 (FIG. 2) and thus the vehicle are driven by a pair of hydraulic drive pumps or motors 10 and 11 (FIG. 1). The drive units 10 and 11 include conventional switching mechanisms which permit such units to also drive the vehicle 61 in a reverse direction when desired. Steering of the vehicle is accomplished by the steering wheel 62 (FIG. 2) which is associated with the controls for the drive units 10 and 11. As the steering wheel 62 is rotated, increased hydraulic pressure is provided to the appropriate one of the units 10 and 11, thus driving the associated drive wheel faster than the other. This causes the vehicle to turn in the desired direction. By way of example, if the steering wheel 62 of FIG. 2 is turned toward the left, hydraulic flow provided by the drive unit controlling the right front drive wheel 64 would be increased, thus causing the right wheel to rotate faster than the left, thereby causing the vehicle to turn toward the left. The steering wheel 62 does not directly control the rotation of the castor wheel 56; rather, the pivoting of such castor wheel is selectively controlled by the steering assist device of the present invention.

Each of the drive units 10 and 11 includes a pair of ports connected and in communication with the various hydraulic pressure chambers driving the drive wheels. In particular, the drive unit 10 includes ports 12 and 13 while drive unit 11 includes ports 14 and 15. During operation one of the ports in each pair of ports is a high pressure port driving one of the drive wheels 64 (FIG. 2) in either a forward or reverse direction, while the other serves as a low pressure return port. In the preferred embodiment, the chamber to which port 12 is connected drives the left drive wheel forward, the chamber to which the port 13 is connected drives the left wheel in reverse, the chamber to which port 14 is connected drives the right wheel in reverse, and the chamber to which the port 15 is connected drives the right wheel forward. When the conventional shifting mechanism is shifted to one of the forward positions, the ports 12 and 15 are the high pressure ports driving the left and right drive wheels, respectively. When the shifting mechanism is shifted to a reverse position, the ports 13 and 14 are the high pressure ports driving the left and right wheels in a reverse direction, respectively. As previously mentioned, the ports 12–15 not functioning as high pressure ports function as return or low pressure ports.

It is contemplated that the variety of different types of hydraulic drive units or pumps can be used; however, in the preferred embodiment, the drive units 10 and 11 are 18 series tandum drive pumps as manufactured by the Sunstrand Company of Ames, Iowa.

The improvement to the tractor or power vehicle as described above relates to a steering assist device for rotating the rear castor wheel 56 to assist the drive wheels in turning the vehicle. This generally includes a power means for selectively rotating the castor wheel 56 about the vertical axis 54, a sensing or access means for sensing or providing access to the respective pressures and flow driving the drive wheels and a control means for controlling actuation of the power means in response to the pressures and flow driving the drive wheels. In the preferred embodiment, the power means includes the hydraulic cylinder assembly 50, the sensing means includes the pilot lines 26 and 28 and associated shuttle valve assembly and the control means includes the pair of first and second control valves 29 and 30. Also, in the preferred embodiment, the power means is driven by hydraulic power from the drive units 10 and 11. The specific construction of the preferred embodiment will be described below.

In addition to the drive units 10 and 11 functioning to drive the vehicle, they also serve to drive and control the steering assist device. Specifically, hydraulic lines are tapped into the two drive pumps 10 and 11 to serve as pilot lines controlling the pair of steering control valves 29 and 30. These hydraulic lines 16, 17, 19 and 18 are tapped into hydraulic drive units 10 and 11 at the ports 12, 13, 14 and 15, respectively. Each of the hydraulic lines 16–19 is in turn connected with a portion of a shuttle valve assembly as shown in FIG. 1. The lines 16 and 18 are connected to opposite ends of the shuttle valve 22 and the lines 17 and 19 are connected to opposite ends of the shuttle valve 20. Connected with each outlet port from the shuttle valves 20 and 22 is the first port or end of a conventional "T" member 24 and 25. A second port or end of each of the "T" members 24 and 25 is connected with opposite incoming ports of a third shuttle valve 21 while the third port of each of the "T" members 24 and 25 is connected with hydraulic lines 26 and 28, respectively. The lines 26 and 28 form the pilot lines for controlling the operation of the steering control valves 30 and 29, respectively. The outlet port of the shuttle valve 21 is connected to the hydraulic line 27 which serves as the hydraulic power source for the steering assist device.

The shuttle valves 20, 21 and 22 are conventional shuttle valves of the type illustrated more specifically in FIG. 7. Each of the shuttle valves includes a pair of inlet ports 65, an outlet port 68, a valve element in the form of the steel ball 66, and an opening 69 allowing for communication between the outlet port 68 and the interior of the shuttle valve. In operation, the ball 66 is caused to move in the direction opposite to the high pressure line of the two incoming ports 65, causing it to seat against a seating surface at the inner ends of the ports 65. This allows for the fluid in the high pressure line to flow from such line through to its respective incoming port 65 and out through the outlet port 68. For example, if high pressure was being provided to the shuttle valve of FIG. 7 at the right hand inlet port 65, the ball 66 would move toward the left allowing for the flow of fluid from the right hand inlet 65 to the outlet port 68 and preventing the flow of fluid from the left hand inlet port 65. Thus, the shuttle valves 20 and 22 insure that the operative ones of the pressure ports 12–15 are connected to the pilot lines 26 and 28, while the shuttle valve 21 insures that the highest pressure of the operative pressure ports 12–15 is directed to the pressure line 27.

Each of the pilot lines 26 and 28 is connected with one end of a steering control valve 30 and 29, respectively. As will be described in more detail below, the pressure in pilot lines 26 and 28 act on the respective control valves 30 and 29 to control and coordinate the shifting of the valve assemblies therein between their various positions. The pressure line 27 leads from the shuttle valve 21 to one end of a cross "T" 32. From the cross "T" 32, one of the pressure lines 46 is connected with the pressure inlet port of the control valve 30 and a second pressure line 40 is connected with the pressure inlet port of the control valve 29. The third outlet from the cross "T" 32 connects with the three way valve 41. Each of the control valves 30 and 29 also includes an outlet "T" 38 and 36, respectively. The outlet "T"s 38 and 36 are connected via the hydraulic lines 45 and 49 to a low pressure reservoir or tank 53.

While the control valves 29 and 30 can be of different types, the valves 29 and 30 of the preferred embodiment are closed center, four way valves of the type manufactured by Williams Machine and Tool Company of Omaha, Nebraska. Each of these values is positionable in one of the following positions: (a) a first position supplying high pressure hydraulic fluid to its respective end of the hydraulic cylinder means 50, (b) a second position draining hydraulic fluid from its respective end of the hydraulic cylinder means 50 to the reservoir 53, and (c) a third position preventing flow of hydraulic fluid to or from its respective end of the hydraulic cylinder means.

Figure 3:
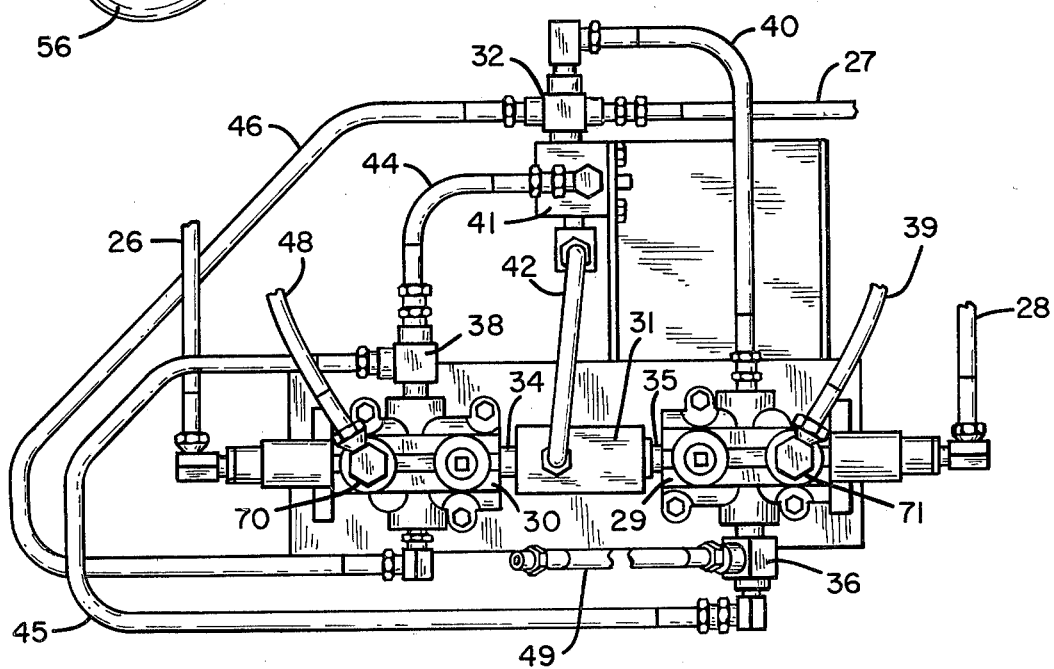
FIG. 3 is a plan view of the control portion of the steering assist device of the present invention.

With reference to FIGS. 1 and 3, each of the control valves 30 and 29 is connected with a centrally disposed control mechanism comprising a shifting cylinder 31 and a pair of valve spools 34 and 35 in opposite ends of the shifting cylinder 31. Each of the valve spools 34 and 35 extends through its respective control valve 30 and 29 and is exposed to pressure from the respective pilot lines 26 and 28. Because of the shifting cylinder 31, the spools 34 and 35 and the orientation of the valves 29 and 30, pressures from the pilot lines 26 and 28 oppose each other, thus coordinating shifting of the valves 29 and 30 between their various operative positions. The particular orientation of the valves 29 and 30 is such that when one of the valves is in its first position, the other valve is in its second position. Accordingly, if the pressure in pilot line 28 is greater than the pressure in pilot line 26, the cylinder 31 and spools 34 and 35 will be shifted toward the left as viewed in both FIGS. 1 and 3. This movement shifts the valve 30 to its first position causing pressure to be supplied from the pressure line 46 through the valve 30 and to the pressure line 48 by which it is directed to one end of the cylinder 50. Such movement toward the left shifts the valve 29 to its second position thereby closing entry of the high pressure line 40 and opening the hydraulic line 39 to the low pressure reservoir 53 via the line 49. When the pressure in pilot line 26 is greater, the cylinder 31 shifts toward the right shifting the valve 29 to its first position and the valve 30 to its second position. When the pressure in pilot lines 26 and 28 are equal, such as when the vehicle is traveling straight ahead on level ground, the forces on the cylinder 31 are balanced, thus causing it to be disposed centrally between the two control valves 30 and 29. In this position, the ports 70 and 71 of the control valves 30 and 29 are closed, thus preventing any flow of hydraulic fluid either to or from the cylinder 50. In this condition, the rear wheel 56 is positioned for straight ahead movement as illustrated in FIG. 1. It should be noted that supplying of hydraulic pressure to the left end of the cylinder 50 through the line 39 will cause the wheel 56 to be rotated in a clockwise direction about the axis 54 as viewed in FIG. 1 and in a counterclockwise direction when pressure is supplied through the line 48 to the right end of the cylinder 50.

With reference to FIG. 6, the shifting cylinder 31 includes means in the form of a piston assembly for locking out or selectively activating or deactivating the steering assist device. This means includes a generally cylinderically shaped housing 72 having a small piston 76 disposed within the generally cylindrical cavity 81. The cylinder 31 also includes a high pressure inlet port 78 for providing high pressure hydraulic fluid to the piston 76. A pair of appropriate primary and secondary seals, 74 and 75, respectively, are positioned about the pheriphery of the piston 76 to prevent hydraulic fluid from leaking between the piston 76 and the housing 72. A generally cylindrical cavity 79 at one end of the cylinder 31 retains one end of the valve spool 34. As illustrated, the spool 34 fits within the cavity 79 and moves generally therewith. As described above with respect to FIG. 1, movement of the spool 34 toward the left is caused by appropriate pressure from the cylinder 31. Opposing this movement toward the left is the pressure exerted on the opposite end of the spool 34 by the pressure in the pilot line 26. A second similar cylindrical cavity 80 is located in the outer end of the piston 76. This cavity 80 houses an end of the other valve spool 35. Similar the the spool 34, the spool 35 is exposed to pressure from the pilot line 28. The port 78 is connected with the hydraulic line 42 which is in turn connected with the outlet port of a three way gauge valve 41 (FIG. 1). The valve 41 functions to control the supply of high pressure to the shifting cylinder 31 to activate the piston 76. The guage valve 41 has two positions: a first position in which it sends high pressure to the cylinder 31 to force the spools 34 and 35 into their respective valves and a second position in which it opens the cylinder 31 to the low pressure reservoir causing the spools 34 and 35 to collapse into the cylinder 31 as a result of pressure in the pilots 26 and 28. When high pressure fluid is provided to the left hand end of the piston 76, the piston is moved toward the right, thus causing both the spools 34 and 35 to move toward their respective control valves and causing both valves 29 and 30 to be in their second position. In this position, the steering assist device is in its float mode in which both of the hydraulic lines 39 and 48 are connected by their respective valves 29 and 30 to the low pressure reservoir. Thus, the hydraulic cylinder 50 is not provided with any high pressure fluid, but is allowed to merely float in response to normal turning pressures created on the rear wheel 56.

Figure 4:
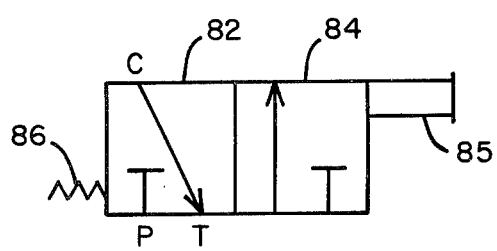
FIG. 4 is a schematic representation of the three way valve for deactivating the steering assist device.
Figure 5:
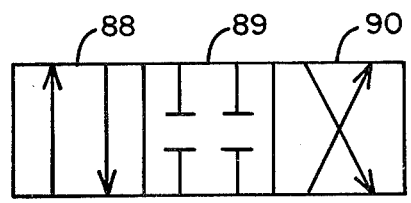
FIG. 5 is a schematic representation of the control valves utilized in the preferred embodiment of the steering assist device.

Referring to FIG. 1, the guage valve 41 includes means connected with a manual actuator such as a hand lever or foot pedal 77 to allow the operator to selectively shift the valve 41 between its first and second positions as described above. This respectively deactivates the steering assist device by providing high pressure to the cylinder 31 or allows activation of the steering assist device by connecting the cylinder 31 to the low pressure reservoir. The valve 41 receives high pressure fluid from the cross "T" 32 via an inlet port. One outlet port is connected to the hydraulic line 42 and a second outlet port is connected to the line 44 which is ultimately connected to the low pressure reservoir 53. Although different types of valves will work satisfactorily as the spool shifting valve 41, the preferred embodiment of the present invention utilizes a conventional three way valve manufactured by the Racine Valve Company of Racine, Wisconsin. A schematic representation of this valve is illustrated in FIG. 4. As shown, the valve includes a spring member 86 which continually urges or biases such valve toward the position illustrated by reference numeral 82 in which the working or control port C (the one connected with the hydraulic line 42) is connected with the pressure reservoir tank T and the incoming pressure line P is blocked. The valve 41 also includes a mechanical actuator such as a foot pedal or the like which is schematically illustrated by the reference numeral 85. When the actuator 85 is depressed, the force of the spring 86 is overcome, thereby moving the valve into the position of 84 in which the high pressure inlet is connected with the line 42 and the tank line is closed off. In such position, the high pressure source is connected with the line 42 (FIGS. 1 and 6) thus forcing the cylinder 76 (FIG. 6) outwardly, shifting both of the valves 29 and 30 in their second position and placing the entire valve assembly in the float mode.

With reference again to FIGS. 1 and 2, the steering assist device of the present invention controls the rotation of the rear castor wheel 56 about the vertical axis 54. The axis 54 extends between the crank member 52 and the wheel support 58 and is appropriately supported with respect to the vehicle body. One end of the extendable and retractable piston element 51 is pivotally secured to an outer end of the crank 52 at the point 55. The other end of the piston 51 extends into the cylinder 50. The cylinder 50 in turn is pivotally connected to the vehicle at the point 60. It should be noted that the construction of the cylinder assembly 50 and the wheel crank 52 is such that when the vehicle changes from a forward to a reverse direction, the castor wheel 56 and thus the elements 58, 54 and 52 rotate 180°, thus resulting in the piston 51 being disposed on the opposite side of the shaft 54 from that shown in FIG. 1. Thus, these elements must be constructed to provide sufficient clearance between the vertical shaft 54 and the piston 51 when such movement occurs.

Having described the structural features and elements of the present invention in detail, the general operation of such invention can be understood as follows. If the tractor illustrated in FIG. 2 is being operated on the side of a hill with the left drive wheel on the uphill side, additional pressure will be created in the drive unit 10 and in particular, the chamber to which the port 12 is connected. Thus, of the two operative ports 12 and 15 when the tractor is moving in a forward direction, the port 12 would be greater, thereby resulting in a greater pressure in the pilot line 28. This greater pressure would thus cause the cylinder 31 and the entire valve shifting assembly to be moved toward the left as shown in FIG. 1, shifting the control valve 30 to its first position supplying pressurized fluid to the right end of the cylinder 50. The valve 29 would be shifted to its second position allowing hydraulic fluid to drain from the left end of the cylinder 50. This would cause rotation of the castor wheel 56 in a counterclockwise direction about the pivot 54 and thus movement to assist the left drive wheel.

Similarly, if the tractor is driven on level ground and is being turned toward the left, greater pressure is developed in the right drive wheel served by the drive unit 11 and in particular the chamber with which the port 15 is associated. This greater pressure at the port 14 results in a greater pressure in pilot line 26, thus resulting in the shifting of the cylinder 31 and the valve shifting assemblies toward the right. This results in the valve 29 being in its first position supplying hydraulic pressure to the left end of the cylinder 50 and the valve 30 being in its second position draining hydraulic fluid from the right end of the cylinder 50. Thus, the castor wheel 56 is rotated in a clockwise direction about the pivot 54 thereby assisting the turning of the vehicle toward the left, When the vehicle is traveling in a straight line on level ground, the hydraulic pressures driving the respective drive wheels are equal, thus resulting in balanced pressures in the pilot lines 26 and 28 and thus a central position for the cylinder 31. When this occurs, the valves 29 and 30 are both in their third position blocking flow of hydraulic fluid to or from the cylinder 50. In the preferred embodiment, the steering assist device is rendered operative by depressing the foot pedal or other manual device 77, thus causing pressure to be supplied to the cylinder 31. This pressure as illustrated in FIG. 6, forces the piston 76 outwardly, thus overriding any pressure forces in the pilot lines 26 and 28 and causing both of the control valves 29 and 30 to be shifted to their second positions.

While the description of the preferred embodiment of the present invention has been quite specific, it is contemplated that various modifications could be made without deviating from the spirit of the present invention. For example, the preferred embodiment contemplates the power means and the control means to be operated by hydraulic fluid pressure. This is not necessary to utilize the inventive features of the present invention since the power means for rotating the castor wheel could be something other than the hydraulically powered cylinder and the control means could be something other than hydraulically controlled valves. It is important, however, that the respective hydraulic pressures driving the forward drive wheels be sensed and that the power means and the control means be responsive to such pressures. Therefore, it is intended that the scope of the present invention be dictated by the claims rather than by the description of the preferred embodiment.

We claim:

1. In a vehicle of the type having a pair of drive wheels in which steering is accomplished by applying differential hydraulic flow to the respective drive wheels and a non-driven castor wheel means, the improvement relating to a steering assist device and comprising:
    power means for selectively rotating the non-driven castor wheel means about a vertical axis in one of two rotatable directions;
    access means for providing access to the hydraulic pressure driving each of said drive wheels;
    control means connected with said access means and including means for controlling the actuation of said power means in response to the hydraulic pressure driving said drive wheels and means for causing said means to rotate said non-driven castor wheel means in a direction to assist the drive wheel being driven by the greater hydraulic pressure.

2. The apparatus of claim 1 wherein said power means includes a hydraulic cylinder means.

3. The apparatus of claim 2 including a crank member rigidly connected with the vertical axis of said castor wheel means for pivotal connection with one end of said hydraulic cylinder means.

4. The apparatus of claim 2 wherein said control means includes first and second control valves connected with opposite ends of said hydraulic cylinder means for controlling the flow of hydraulic fluid to and from said cylinder means.

5. The apparatus of claim 4 wherein each of said first and second control valves is positionable in one of the following positions:
    (a) a first position supplying high pressure hydraulic fluid to its respective end of said hydraulic cylinder means,
    (b) a second position draining hydraulic fluid from its respective end of said hydraulic cylinder means, and
    (c) a third position preventing flow of hydraulic fluid to or from its respective end of said hydraulic cylinder.

6. The apparatus of claim 5 having means for coordinating the movement of said control valves whereby when said first control valve is in its first position, said second control valve is in its second position and when said second control valve is in its first position, said first control valve is in its second position.

7. The apparatus of claim 6 wherein said means for coordinating the movement of said control valves includes means connected with said access means whereby the position of said first and second control valves is responsive to the hydraulic pressures driving the tractor drive wheels.

8. The apparatus of claim 7 including first and second pilot lines connected with the hydraulic pressure sources driving said drive wheels, said first and second pilot lines being connected with said first and second control valves, respectively, for controlling the movement thereof between said first, second and third positions.

9. The apparatus of claim 8 wherein said means for coordinating said control valves includes a valve shifting cylinder disposed between said first and second control valves and having one end connected with said first control valve and its other end connected with said second control valve.

10. The apparatus of claim 9 wherein the pressures in said first and second pilot lines oppose each other through said first and second control valves and said valve shifting cylinder.

11. The apparatus of claim 10 including means for selectively actuating and deactuating said steering assist device including means for overiding the pressure in said first and second pilot lines and causing both of said first and second control valves to be in said second position.

12. The apparatus of claim 11 wherein said means for selectively actuating and deactuating said steering assist device includes a hydraulic piston means connected with said valve shifting cylinder.

13. The apparatus of claim 12 wherein said means for selectively actuating and deactuating said steering assist device includes a selector valve for selectively directing hydraulic fluid pressure to said hydraulic piston means and means for manually controlling said selector valve.

14. The apparatus of claim 1 wherein said access means includes a first shuttle valve means for enabling said steering assist device to be operative when said tractor is being driven in both a forward and a reverse direction.

15. The apparatus of claim 14 wherein said first shuttle valve means includes a pair of shuttle valves.

16. The apparatus of claim 2 including a hydraulic pressure source for driving said hydraulic cylinder means.

17. The apparatus of claim 16 wherein said hydraulic pressure source includes the greater of the hydraulic pressures driving said drive wheels.

18. The apparatus of claim 17 including second shuttle valve means for directing the greater of the hydraulic pressures driving said drive wheels to said control means.

19. A steering assist device for a vehicle of the type having a pair of hydraulically driven drive wheels and a non-driven caster wheel means, said steering assist device comprising:

power means for selectively rotating the non-driven castor wheel means about a vertical axis in one of two rotatable directions;

access means for providing access to the hydraulic pressure driving each of said drive wheels;

control means connected with said access means for controlling the actuation of said power means in response to the hydraulic pressure driving said drive wheels and including valve means for causing said power means to rotate said non-driven castor wheel in a direction tending to assist the drive wheel being driven by the greater hydraulic pressure.

20. A vehicle comprising:

a pair of hydraulically driven drive wheels;

a non-driven castor wheel means;

means for steering the vehicle by applying differential hydraulic flow to said drive wheels;

power means for selectively rotating the non-driven castor wheel means about a vertical axis in one of two rotatable directions;

access means for providing access to the hydraulic pressure driving each of said drive wheels;

control means connected with said access means for controlling the actuation of said power means in response to the hydraulic pressure driving said drive wheels and including valve means for causing said power means to rotate said non-driven castor wheel in a direction tending to assist the drive wheel being driven by the greater hydraulic pressure.

* * * * *